(12) United States Patent
Cauchon et al.

(10) Patent No.: US 11,560,486 B2
(45) Date of Patent: *Jan. 24, 2023

(54) METHOD AND RESINS FOR CREATING ELECTRICALLY-CONDUCTIVE OBJECTS

(71) Applicant: Xilico, LLC, Thousand Oaks, CA (US)

(72) Inventors: Greg P Cauchon, Thousand Oaks, CA (US); Ian D McFadden, Oxnard, CA (US); Samir Sachdev, Camarillo, CA (US)

(73) Assignee: XILICO, LLC, Thousand Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/872,193

(22) Filed: May 11, 2020

(65) Prior Publication Data

US 2020/0270466 A1  Aug. 27, 2020

Related U.S. Application Data

(63) Continuation of application No. 14/996,126, filed on Jan. 14, 2016, now Pat. No. 10,647,857.

(60) Provisional application No. 62/103,530, filed on Jan. 14, 2015.

(51) Int. Cl.
| | |
|---|---|
| *C09D 5/24* | (2006.01) |
| *C09D 135/02* | (2006.01) |
| *C09D 4/00* | (2006.01) |
| *C09D 7/40* | (2018.01) |
| *C08K 3/04* | (2006.01) |

(52) U.S. Cl.
CPC ............... *C09D 5/24* (2013.01); *C08K 3/042* (2017.05); *C08K 3/045* (2017.05); *C08K 3/046* (2017.05); *C09D 4/00* (2013.01); *C09D 7/67* (2018.01); *C09D 7/68* (2018.01); *C09D 135/02* (2013.01); *C08K 3/041* (2017.05); *C08K 2201/011* (2013.01)

(58) Field of Classification Search
None
See application file for complete search history.

(56) References Cited

U.S. PATENT DOCUMENTS

| | | | |
|---|---|---|---|
| 3,907,717 A | 9/1975 | Hebert | |
| 5,514,729 A | 5/1996 | Diamant et al. | |
| 7,431,965 B2 | 10/2008 | Grigorian et al. | |
| 2002/0132928 A1* | 9/2002 | Soane | C08F 259/00 |
| | | | 525/242 |
| 2003/0035917 A1 | 2/2003 | Hyman | |
| 2007/0202403 A1 | 8/2007 | Oh et al. | |
| 2007/0246245 A1 | 10/2007 | Ahn et al. | |
| 2008/0250972 A1 | 10/2008 | Oldenzijl | |
| 2008/0281014 A1 | 11/2008 | Momose et al. | |
| 2010/0252184 A1 | 10/2010 | Morimoto et al. | |
| 2011/0123732 A1 | 5/2011 | Foley et al. | |
| 2012/0256139 A1 | 10/2012 | Hunt et al. | |
| 2012/0282448 A1 | 11/2012 | Chretien et al. | |
| 2014/0311779 A1 | 10/2014 | Furusho et al. | |
| 2017/0297262 A1 | 10/2017 | Grigorian | |

OTHER PUBLICATIONS

Marcos Nunes Dos Santos et al., Nanocomposite of Photocurable Epoxy-acrylate Resin and Carbon Nanotubes: Dynamic-mechanical, Thermal and Tribological Properties, Materials Research, 2013, 367-374.

M. S. Dresselhaus et al., Defect Characterization in Graphene and Carbon Nanotubes using Raman Spectroscopy, Philosophical Transactions of The Royal Society, Mathematical Physical and Engineering Sciences, 2010, 5354-5377.

Andrea C. Ferrari, Raman spectroscopy of graphene and graphite: Disorder, electron-phonon coupling, doping and nonadiabatic effects, ScienceDirect, Solid Slate Communications, 2007, 47-57, vol. 143, Cambridge University Engineering Department, Cambridge, UK.

G. L. Hornyak et al., A Temperature Window for Chemical Vapor Decomposition Growth of Single-Wall Carbon Nanotubes, J. Phys. Chem. B, 2002, 2821-2825, National Renewable Energy Laboratory, Golden, Colorado.

Mukul Kumar et al., Chemical Vapor Deposition of Carbon Nanotubes: A Review on Growth Mechanism and Mass Production, Journal of Nanoscience and Nanotechnology, 2010, 3739-3758, vol. 10, American Scientific Publishers, Nagoya, Japan.

M. Martin-Gallego et al., Cationic photocured epoxy nanocomposites filled with different carbon fillers, Polymer 53, 2012, 1831-1838.

Marco Sangermano et al., Use of Single-Walled Carbon Nanotubes as Reinforcing Fillers in UV-Curable Epoxy Systems, Macromolecular Materials and Engineering, 2008, 708-713.

Shota Ushiba et al., 3D microfabrication of single-wall carbon nanotube/polymer composites by two-photon polymerization lithography, Carbon, 2013, 283-288.

Yue-Feng Zhu et al., Alignment of muitiwalled carbon nanotubes in bulk epoxy composites via electric field, Journal of Applied Physics, 2009, 054319-1-054319-6.

Marcos N. Dos Santos, Thermal and mechanical properties of a nanocomposite of a photocurable epoxy-acrylate resin and multiwalled carbon nanotubes, Materials Science and Engineering A 528, 2011, 4318-4324.

Dong, Study on tribological properties of multi-walled carbon nanotubes/epoxy resin nanocomposites, Tribology Letters, 2005, 251-254, vol. 20, Lanzhou, China.

Gojny, Carbon nanotube-reinforced epoxy-composites: enhanced stiffness and fracture toughness at low nanotube content, 2004, 2363-2371, Composites Science and Technology 64.

\* cited by examiner

*Primary Examiner* — Katie L. Hammer

(74) *Attorney, Agent, or Firm* — Cislo & Thomas, LLP

(57) ABSTRACT

A method and resins for use with three-dimensional printing systems and/or other energy-curing devices to create 3-D objects having electrical conductivity. The resins comprise an initiator, a photopolymerizable agent, and a nanocarbon, particularly, single-walled carbon nanotubes. The initiator, photopolymerizable agent, and nanocarbon are mixed and agitated without fully solubilizing the nanocarbon so as to maintain the electrically conductive property.

34 Claims, No Drawings

METHOD AND RESINS FOR CREATING ELECTRICALLY-CONDUCTIVE OBJECTS

CROSS REFERENCE TO RELATED APPLICATIONS

This patent application is a continuation of U.S. patent application Ser. No. 14/996,126, entitled "Method and Resins for Creating Electrically-Conductive Object," filed Jan. 14, 2016, which claims the benefit of U.S. Provisional Patent Application Ser. No. 62/103,530, entitled "NANOCARBON COMPOSITES FOR 3-D PRINTING," filed Jan. 14, 2015, which applications are incorporated in their entirety here by this reference.

BACKGROUND

Technical Field

This disclosure relates to methods and resins for creating electrically-conductive objects. This disclosure relates to composites comprising forms of nanocarbon. This disclosure particularly relates to composites comprising carbon nanotubes. This disclosure also particularly relates to composites comprising graphene, and to nanodiamonds, and to other forms of nanocarbon. This disclosure also particularly relates to three-dimensional printing systems and/or devices comprising the any of the various forms of nanocarbon. This disclosure also particularly relates to ultraviolet- or visible-radiation or electron-beam photocurable materials containing any of the various forms of nanocarbon. This disclosure also particularly relates to fibers and filaments containing any of the various nanocarbon forms on their surfaces and/or within their interior. This disclosure particularly relates to systems and/or devices comprising these nanocarbon materials and/or composites.

Description of Related Art

The polymerization of chemical monomers can be accomplished by any of a number of mechanisms, including heat, sound, and electromagnetic radiation such as light, electron beams, and microwaves, among many other methods well known to those skilled in the art.

Three-dimensional (3-D) printing refers to a family of additive technologies for building 3-D solid or partially-solid objects by sequentially or simultaneously depositing layers of materials according to a design produced using a computer-aided design (CAD) software application. This technology can be used to create highly-customized complex parts and products that are difficult or impossible to manufacture using traditional technologies. This technology can also be used to rapidly create prototype objects which could take much longer to produce by other means. This technology can also be used to create objects at a lower cost than they could be produced using other means.

There are several major 3-D printing technologies differing mainly in the way successive layers are built to create the final 3-D object. Some methods use melting or softening and deposition of a material (referred to generally as the 'build material') to produce the layers of the growing object. For example, selective laser sintering (SLS) works by laying down a thin layer of powdered metal, plastic, ceramic, or glass and then sintering the intended cross-sectional area of each layer to produce the desired object. Powder printing works similarly, except that the layers of powdered materials which are laid down are then printed over using a technology such as an ink-jet printer to create the cross-sectional image of the desired object. Fused-deposition modeling (FDM) works by extruding melted plastic or metal, often supplied in the form of filaments or wires, through an extrusion nozzle to form the successive layers. Stereolithography (or stereolithographic assembly, SLA) is based on curing (polymerizing) liquid materials such as photopolymer resins by applying external energy sources such as ultraviolet (UV) or visible light or electron-beam irradiation to produce each successive layer of a solid object.

A current challenge for the field of 3-D printing is improving the available 3-D printing materials to impart specific properties and versatility which are needed for the ever-expanding range of applications.

Another major challenge for the 3-D printing industry is the lack of efficient electrically-conducting materials with can be employed in 3-D printing and other additive manufacturing and photocurable processes. The ability to reproducibly fabricate electrically-conducting objects using 3-D printing techniques would enable a wide array or new and novel products, including for example electronic devices, energy-storage devices, communications devices, medical devices, aircraft and aerospace vehicles, and numerous other objects which are currently unavailable.

Nanocarbon materials ("nanocarbons") include all forms of carbon in which at least one dimension is smaller than about 1 micrometer (μm). These can include, but are not limited to, single-walled carbon nanotubes (CNT), multi-walled CNT graphenes (GR), fullerenes (FL), nanodiamond, and all other nanoscale carbon forms.

Addition of nanocarbons and their mixtures in various proportions and combinations to metal, plastic, ceramic (including glasses), polymers (including photopolymers), and other 3-D printable materials may lead to formation of nanocarbon composites with increased electrical conductivity, increased thermal conductivity, increased mechanical strength, and other improvements in properties.

A major challenge in this task has long been considered to be ensuring a sufficiently high degree of dispersion of the nanocarbon component in the nanocarbon composite material, since it was believed that only well-dispersed nanocarbons would impart useful properties. Typically, nanocarbon agglomeration results in under-utilization of the potential of the composite nanocarbon material and degraded properties of the product.

A second major challenge is preventing physical, chemical, structural, or other damage to nanocarbons during the process of fabrication of nanocarbon composites. Typically, damaged nanocarbons exhibit inferior properties when incorporated into composite materials.

For further disclosures related to nanocarbon 3-D printing materials including nanocarbon oxides), for example, see the following publications: M. N. dos Santos, C. V. Opelt, S. H. Pezzin, C. A. C. E. da Costa, J. C. Milan, F. H. Lafratta, and L. A. F. Coelho, *Nanocomposite of photocurable epoxy-acrylate resin and carbon nanotubes: dynamic-mechanical, thermal and tribological properties*, Materials Research, 16(2), 367-374 (2013); M. Sangermano, E. Borella, A. Priola, M. Messori, R. Taurino, and P. Potschke, *Use of single-walled carbon nanotubes as reinforcing fillers in UV-curable epoxy systems*. Macromolecular Materials and Engineering, 293(8), 708-713 (2008); Y. F. Zhu, C. Ma, W. Zhang, R. P. Zhang, N. Koratkar, and J. Liang, *Alignment of multiwalled carbon nanotubes in bulk epoxy composites via electric field*. Journal of Applied Physics, 105(5), 1-6 (2009); M. Martin-Gallego, M. Hernandez, V. Lorenzo, R. Verdejo, M. A. Lopez-Manchado, and M. Sangermano, Cationic photocured epoxy nanocomposites filled with different carbon fillers. Polymer, 53(9), 1831-1838 (2012); M. N. dos Santos, C. V. Opelt, F. H. Lafratta, Lepienski C M, S. H. Pezzin, and L. A. F. Coelho, *Thermal and mechanical properties of a nanocomposite of a photocurable epoxy-acrylate resin and multiwalled carbon nanotubes*, Materials Science and Engineering A: Structural Materials Properties Microstructure and Processing, 528(13-14), 4318-4324 (2011); F. H. Gojny, M. H. G. Wichmann, U. Kopke, B. Fiedler, and K. Schulte, *Carbon nanotube-reinforced epoxy-compo sites: enhanced stiffness and fracture toughness at low nanotube content*, Composites Science and Technology, 64(15), 2363-2371 (2004); B. Dong, Z. Yang, Y. Huang, and H. L. Li, *Study on tribological properties of multi-walled carbon nanotubes/epoxy resin nanocomposites*, Tribology Letters, 20(3-4), 251-254 (2005); S. Ushiba, S. Shoji, K. Masui, P. Kuray, J. Kono, and S. Kawata, *3D microfabrication of single-wall carbon nanotube/polymer composites by two-photon polymerization lithography*, Carbon 59, 283-288 (2013). The entire content of these publications is incorporated herein by reference.

A variety of nanocarbon materials (i.e. single-walled, double-walled, and multi-walled CNTs, graphene, nanodiamonds, etc.) are commercially available as dry powders and/or suspensions. CNT nanocarbon materials may be synthesized by a variety of CNT synthesis methods known to those skilled in the art. Some examples of CNT synthesis methods include arc-discharge, laser-vaporization, and chemical vapor deposition (CVD), as are described for example in publications such as M. Kumar and Y. Ando, *Chemical Vapor Deposition of Carbon Nanotubes: A Review on Growth Mechanism and Mass Production*, Journal of Nanoscience and Nanotechnology, vol. 10, pp. 3739-3758 (2010); G. L. Hornyak, L. Grigorian, A. C. Dillon, P. A. Parilla, K. M. Jones, and M. J. Heben, *A Temperature Window for Chemical Vapor Decomposition Growth of Single-Wall Carbon Nanotubes*, Journal of Physical Chemistry B, vol. 106, pp. 2821-2825 (2002); L. Grigorian, G. L. Hornyak, A. C. Dillon, and M. J. Heben, *Continuous growth of single-wall carbon nanotubes using chemical vapor deposition*, U.S. Pat. No. 7,431,965, Oct. 7, 2008. The entire content of these publications is incorporated herein by reference.

The arc-discharge method employs evaporation of metal-catalyzed graphite electrodes in electric arcs that involve very high (about 4,000° C.) temperatures. The laser-vaporization method employs evaporation of a graphite target by lasers in conjunction with high-temperature furnaces. These two methods operate in batch mode and may therefore be poorly suited to high-volume, low cost production. The CVD method is based on decomposition of carbon-containing gases on supported catalyst and may offer the more efficient, low-cost, and scalable method of producing CNTs. Currently, most commercial CNT materials are manufactured by the CVD method.

Thus, the ability to disperse nanocarbon forms adequately in materials which are suitable for 3-D printing in such as way as to obtain electrically-conducting materials and 3-D printed objects would be expected to enable a large number of new and novel products in a wide array of fields and industries.

SUMMARY

This disclosure relates to methods and resins for creating electrically-conductive objects. This disclosure relates to composites comprising nanocarbons. This disclosure particularly relates to systems, devices, and/or materials comprising these composites. This disclosure particularly relates to the composites comprising carbon nanotubes. This disclosure also particularly relates to composites comprising graphene. This disclosure also particularly relates to 3-D printing systems, materials, and/or devices comprising the nanocarbon composites.

A composite may comprise a nanocarbon ("the nanocarbon composite"), A nanocarbon may comprise a non-agglomerated and/or non-damaged nanocarbon, A nanocarbon composite may further comprise a metal, a polymer, a ceramic, glass, or mixtures thereof. A nanocarbon composite may comprise one or more types of nanocarbon, with or without additional components.

A 3-D printing system may comprise the nanocarbon composite.

The non-agglomerated and/or non-damaged nanocarbon may comprise a carbon nanotube, a graphene, a fullerene, nanodiamonds, or a combination thereof. The carbon nanotube may comprise a single-walled carbon nanotube, a double-walled carbon nanotube, a multi-walled carbon nanotube, or a combination thereof. The graphene may comprise a single-layer graphene, a double-layer graphene, a multilayer graphene, one or more graphene strips, or a combination thereof. The fullerene may comprise a $C_{60}$, a $C_{70}$, a $C_{76}$, a $C_{78}$, a $C_{84}$, or a combination or variant thereof.

The metal may comprise titanium, vanadium, chromium, manganese, iron, cobalt, nickel, copper, zinc, ruthenium, rhodium, palladium, aluminum, indium, gallium, tin, silver, gold, platinum, lead, bismuth, an alloy thereof, or any other metal or a combination thereof. Alloys may comprise steel, bronze, brass, or any other alloy or combination thereof.

The polymers may comprise any polymeric material which can be considered as comprising two or more monomers of any kind, and can include but are not limited to ABS (acrylonitrile butadiene styrene), polyamides, nylons, polycarbonates, polyethylenes, polypropylenes, polyimides, polyetherimides, polysulfones, polyethersulfones, polyphenylsulfones, polylactic acids, acrylates, methacrylates, polyepoxides, polyurethanes, polyesters, polysilanes, polysiloxanes, polythioethers, or any other polymers, their blends, mixtures, or a combination thereof.

The agglomeration of the nanocarbons may be visually detectable on an SEM image or a TEM image recorded at a magnification of 1,000:10,000; or 30,000. The absence of nanocarbons visible on an SEM image or a TEM image recorded at a magnification less than or equal to 1,000; 10,000; or 30,000 may indicate a non-agglomerated nanocarbon.

An intensity ratio of the G-band (at $1,580\pm20$ $cm^{-1}$) to the D-band (at $1,350\pm20$ $cm^{-1}$) of the nanocarbons as determined by Raman spectroscopy (i.e., the G/D ratio) may be used to evaluate the damage to nanocarbons due to harsh processing.

A G/D ratio of a nanocarbon incorporated in a nanocarbon composite being 80% lower than, 50% lower than, 25% lower than, 10% lower than, 5% lower than, 2% lower than, 1% lower than, 0.5% lower than, 0.2% lower than, 0.1% lower than, 0.05% lower than, or 0.01% lower than that of the as-synthesized nanocarbon may indicate a non-damaged nanocarbon. Also, a G/D ratio of a nanocarbon incorporated in a composite being at least 80% higher than, at least 50% higher than, at least 25% higher than, at least 10% higher than, at least 5% higher than, at least 2% higher than, at least 1% higher than, at least 0.5% higher than, at least 0.2% higher than, at least 0.1% higher than, at least 0.05% higher than, at least 0.02% higher than, at least 0.01% higher than, or at least equal to that of the as-synthesized nanocarbon may indicate a non-damaged nanocarbon.

A nanocarbon composite comprising non-agglomerated and/or non-damaged nanocarbon may be prepared by using an as-synthesized nanocarbon, a non-agglomerated and/or non-damaged nanocarbon, a nanocarbon slurry, or any combination thereof. A process may comprise using an as-synthesized nanocarbon, a non-agglomerated and/or non-damaged nanocarbon, a nanocarbon slurry, or any combination thereof, and thereby preparing a nanocarbon composite comprising non-agglomerated and/or non-damaged nanocarbon.

The process may further comprise mixing the as-synthesized nanocarbon, the non-agglomerated and/or non-damaged nanocarbon, the nanocarbon slurry, or any combination thereof with a polymer, a metal, a ceramic, or any combination thereof, and thereby preparing a nanocarbon composite comprising non-agglomerated and/or non-damaged nanocarbon.

The as-synthesized nanocarbon may comprise a non-agglomerated and non-damaged nanocarbon obtained from a nanocarbon reactor immediately after the growth of the nanocarbon ceases. The as-synthesized nanocarbon may comprise an as-synthesized carbon nanotube, an as-synthesized graphene, an as-synthesized fullerene, as synthesized nanodiamond, as-synthesized carbon black, or any combination thereof. The as-synthesized carbon nanotube may comprise an as-synthesized single-walled carbon nanotube, an as-synthesized double-walled carbon nanotube, an as-synthesized multi-walled carbon nanotube, or any combination thereof. The as-synthesized graphene may comprise an as-synthesized single-layer graphene, an as-synthesized double-layer graphene, an as-synthesized multilayer graphene, an as-synthesized graphene strip, or any combination of as-synthesized nanocarbon thereof with any other nanocarbon material. The as-synthesized fullerene may comprise an as-synthesized $C_{60}$, an as-synthesized $C_{70}$, an as-synthesized $C_{76}$, an as-synthesized $C_{78}$, a $C_{84}$, or any combination thereof.

The nanocarbon slurry is a slurry comprising a liquid and (a) the as-synthesized nanocarbon, (b) the non-agglomerated nanocarbon, (c) the non-damaged nanocarbon, or (d) any combination thereof. The liquid may comprise any solvent such as an aliphatic or aromatic alcohol, gamma-butyrolactone, N-methylpyrrolidinone, pyridine, dimethylformamide, N,N-dimethylacetamide, water, methylene chloride, toluene, carbon disulfide, dichlorobenzene, cyclohexanone, or any other such solvent or any combination thereof. The liquid may further comprise an acid.

A composite may comprise a particle, a wire, a filament, or a combination thereof coated with a nanocarbon. The particle, the wire, and/or the filament may comprise a metal, polymer, ceramic, or a combination thereof. The particle, the wire, the filament, or the combination thereof may be coated with a nanocarbon by immersing the particle, the wire, and/or the filament into the nanocarbon slurry. After the immersion, the composite may be taken out of the nanocarbon slurry and processed further. This composite may be used as a feedstock for any suitable 3-D printing technology, such as selective laser sintering or fused deposition modeling or any other 3-D printing technology.

A polymeric material such as a particle, a wire, or a filament of any composition may be coated with a nanocarbon by immersing it in a solution or suspension of the nanocarbon in which the nanocarbon is poorly soluble. Such a nanocarbon solution or suspension can be prepared by using a solvent in which the nanocarbon is inherently poorly soluble, such as a poor solvent for the nanocarbon, or else by first dissolving or suspending the nanocarbon in a good solvent and then adding one or more poor nanocarbon solvents to the mixture in order to create a poorer solvent for the nanocarbon. In this way it is possible to create conditions under which the nanocarbon will adhere to the surface of desired particle, wire, or filament.

A polymeric material such as a particle, a wire, or a filament of any composition containing within its bulk a nanocarbon may be prepared by suspending or dissolving the nanocarbon in one or more components of the particle, wire, or filament and then adding the remaining components until the final composition is achieved. For example, a thermosetting polymer can be melted and the desired nanocarbon form can be dispersed into the polymer melt by efficient mixing; subsequent extrusion of the melted polymer/nanocarbon mixture yields particles, wire, or filaments with the nanocarbon contained within the bulk of the product, and these materials are suitable for 3-D printing nanocarbon-containing objects.

A polymeric material such as a particle, a wire, or a filament of any composition containing within its bulk a nanocarbon may be prepared by suspending or dissolving the nanocarbon in a suitable solvent and dispersing the nanocarbon to an acceptable degree. The nanocarbon suspension or solution can then either be evaporated to remove some or all of the solvent or else the entire suspension or solution can be mixed with other polymeric components directly to obtain the final melted polymer/nanocarbon liquid mixture, which can then be extruded to form particles, wire, or filaments with the nanocarbon contained within the bulk of the product, and these materials are suitable for 3-D printing nanocarbon-containing objects.

The nanocarbon composite comprising a non-agglomerated and/or non-damaged nanocarbon may be produced by preparing a nanocarbon slurry comprising an as-synthesized nanocarbon, an non-agglomerated, non-damaged nanocarbon, or a combination thereof, and a monomer, an oligomer, a photopolymer or any combination thereof. This composite may be suitable for stereolithographic (SLA) 3-D printing.

To optimize the electrical conductivity of the energy-curable resin or the thermosetting FDM polymer melt or any objects produced from these materials, the well-dispersed nanocarbon composite must contain components in which the nanocarbon component exhibits only intermediate solubility, such that the nanocarbon is only modestly soluble.

Any combination of above products and processes may be within the scope of the instant disclosure.

These, as well as other components, steps, features, objects, benefits, and advantages, will now become clear from a review of the following detailed description of illustrative embodiments, the accompanying drawings, and the exemplary features.

DETAILED DESCRIPTION OF ILLUSTRATIVE EMBODIMENTS

Illustrative embodiments are now described, Other embodiments may be used in addition or instead. Details that may be apparent or unnecessary may be omitted to save space or to achieve a more effective presentation. Some embodiments may be practiced with additional components or steps and/or without all of the components or steps that are described.

This disclosure relates to methods and resins for creating electrically-conductive objects. This disclosure relates to composites comprising nanocarbons ("the nanocarbon composites"). This disclosure particularly relates to systems and/or devices comprising the nanocarbon composites. This disclosure particularly relates to the nanocarbon composites comprising carbon nanotubes. This disclosure also particularly relates to energy-curable resins containing nanocarbon materials. This disclosure also particularly relates to 3-D printing systems and/or devices and/or materials comprising the nanocarbon composites.

The nanocarbon composites may provide materials with improved properties that may be used in various energy-curing and 3-D printing technologies. These improvements may be achieved by the nanocarbon composites comprising the nanocarbons and other materials in various proportions and combinations. Examples of nanocarbons may comprise carbon nanotubes (CNT), including single-walled carbon nanotubes (SWCNTs), double-walled carbon nanotubes (DWCNTs), and multi-walled carbon nanotubes (MWCNTs), as well as graphemes (GR), fullerenes (FL), nanodiamonds (ND), and combinations and mixtures thereof. Examples of the other materials may comprise polymers, metals, and/or ceramics. For example, the polymers, metals, and/or ceramics may comprise the polymers, metals, and/or ceramics that are currently used in various energy-curing and 3-D printing technologies.

As disclosed above, the nanocarbon materials may be synthesized by variety of synthesis methods. The nanocarbon formation and growth may stop during the synthesis. The nanocarbon formation and growth may stop due to decreased catalyst activity when the catalyst's surface is covered with an amorphous carbon layer. Or the nanocarbon formation and growth may be stopped after a pre-determined period of synthesis. At this process stage, the nanocarbons are "as-synthesized nanocarbons".

The as-synthesized nanocarbons may be processed before they are used. For example, the as-synthesized nanocarbons may be incorporated into a liquid or mixed with a liquid. This incorporation may be done, for example, to dissolve impurities (e.g. non-nanocarbon material), to provide a nanocarbon suspension, or a combination thereof. Examples of impurities may be non-nanocarbon carbons (e.g. amorphous carbon), inorganic catalysts, catalyst supports, or a combination thereof.

The liquid mixture at this process stage comprises a liquid and an as-synthesized nanocarbon ("the nanocarbon slurry"), The liquid may comprise any liquid. For example, the liquid may comprise water, solvent, monomers, oligomers, polymers, or mixtures thereof. The solvent may comprise any solvent. For example, the solvent may comprise a hydrocarbon solvent such as an alcohol, ketone, ester, ether, alkane, alkene, aromatic hydrocarbons (such as benzene, toluene, and/or various derivatives), or mixtures thereof. The nanocarbon slurry may further comprise an acid, a base, a suspension agent, or a combination thereof.

In one example, the CVD process may involve passing a hydrocarbon vapor through a reactor at a sufficiently high temperature, varying in the range of 600° C. to 1200° C., and in presence of a catalyst to decompose the hydrocarbon. In one example, the catalyst may comprise metals and/or metal oxides (e.g., Fe, Co, Ni, Mo, their oxides, and a combination thereof). The catalyst may be nanoparticles of such metals and/or metal oxides. In one example, support material may comprise alumina, silica, magnesium oxide, and a combination thereof. The nanocarbons may form and grow on catalyst particles in the reactor and may be collected upon cooling the system to a room temperature. These nanocarbons collected directly from the reactor and not yet treated in any way are the as-synthesized nanocarbons. The as-synthesized nanocarbons may comprise at least 50 wt % of inorganic impurities including the catalyst and the support material, which may need to be removed to produce a material comprising nanocarbons with desired properties.

In one example, the as-synthesized nanocarbons may be purified by being immersed in acids (such as $H_2SO_4$, $HNO_3$, HCl, and a combination thereof) and refluxed for a period varying in the range of 1 hour to 24 hours resulting in significantly decreased amount of impurities (down to a few weight percent of impurities). The purified nanocarbon material may be thoroughly washed to remove any residual acid and then dried in a convection oven at a temperature varying in the range of 20° C. to 150° C. for a period varying in the range of 1 hour to 48 hours.

The as-synthesized and purified nanocarbons may be easily dispersed in the liquid since they may not be substantially agglomerated. However, upon being wetted and subsequently dried, the nanocarbon material may be converted into an agglomerated and tangled mat comprising irregular clusters of individual nanocarbons. This post-drying transition may occur due to the high surface areas and highly-hydrophobic surfaces of the nanocarbon. This condition may make the conformation of straight individual nanocarbons energetically unstable and susceptible to deformation and agglomeration.

The instability may greatly be increased by introducing a liquid between individual nanocarbons and then evaporating the liquid. In other words, wetting and then drying the nanocarbons may induce severe agglomeration due to attraction forces exerted by liquids in intimate contact with the nanocarbon surface. Upon drying, the nanocarbons may coalesce into large bundles (including tens to hundreds of nanocarbons in cross section), which then form a highly tangled structure. These agglomerated structures may not exhibit many of the remarkable properties expected of individual, well-dispersed and/or isolated nanocarbons.

Commercially available nanocarbon materials are typically those of the purified and dried grade, marketed either as a powder obtained after drying, or as a nanocarbon suspension produced by re-dispersing the dry purified powder in either an aqueous or organic solvent. The commercially available purified grades of the nanocarbon materials ("commercial nanocarbons") may undergo at least one wetting and drying cycle before they are supplied to a user, Commercial nanocarbons may thereby have agglomerated structures.

It may then be difficult to disperse this agglomerated structure down to the level of individual nanocarbons that may be required for many applications. To accomplish this task, commercially available grades of nanocarbon materials may have to be subjected to vigorous harsh treatments that may consume a lot of energy and inflict considerable collateral damage upon the nanocarbon material (e.g., by destroying some nanocarbons, creating defects in nanocarbon walls, and/or cutting nanocarbons into shorter segments) resulting in degraded nanocarbon material properties.

In one example, this disclosure relates to a method comprising the use of the as-synthesized nanocarbons, the non-agglomerated and/or non-damaged nanocarbons, the nanocarbon slurry, or the combination thereof to prepare the nanocarbon composites. The drying-induced agglomeration and entanglement, as well as damage during processing of agglomerated nanocarbon, may thereby be avoided. For example, the purified nanocarbons may be kept in a suspension or, at least, as the nanocarbon slurry (the "purified nanocarbon slurry"). In other words, the as-synthesized nanocarbon materials may be purified by refluxing in acids but then never be allowed to dry before reaching the customer, instead being kept as the purified nanocarbon slurry. The customer may either use the purified nanocarbon slurry or, if necessary, exchange the liquid with another liquid and process the nanocarbon slurry as desired, allowing it to dry only at the final step of their process. This arrangement significantly facilitates dispersion and prevents damage to nanocarbon materials, resulting in improvement of product properties and performance.

The process of dispersing the purified nanocarbon slurry material down to the level of individual nanocarbon components may be accomplished through any of a number of means including mixing, sonicating, or homogenizing techniques, or a combination thereof. As compared to the current commercial nanocarbon materials, the dispersion of the purified nanocarbon slurry material may require much less effort and inflict much less damage to nanocarbon s in the process of achieving the desired degree of dispersion. The same considerations may apply to other types of nanocarbon materials. Higher degrees of dispersion and reduced damage to nanocarbon structures may result in improved properties. The dispersion process may be carried out in either aqueous or organic solvents or in the absence of a solvent. Examples of aqueous or organic solvents may include, but are not limited to, water, hydrocarbons, toluene, alcohol, carbon disulfide, dichlorobenzene, dimethylformamide, N-methylpyrrolidinone, pyridine, and mixtures thereof.

The purified nanocarbon slurry may comprise a liquid and a nanocarbon. The nanocarbon may comprise less than 80 wt %, less than 50 wt %, less than 25 wt %, less than 10 wt %, less than 5 wt %, less than 4 wt %, less than 3 wt %, less than 2 wt %, less than 1 wt %, less than 0.8 wt %, less than 0.6 wt %, less than 0.5 wt %, less than 0.4 wt %, less than 0.3 wt %, less than 0.2 wt %, less than 0.1 wt %, less than 0.05 wt %, less than 0.03 wt %, less than 0.02 wt %, less than 0.01 wt %, less than 0.005 wt %, less than 0.002 wt %, or less than 0.001 wt % of the nanocarbon slurry. The presence of sufficient number of liquid molecules in intimate contact with nanocarbons stabilizes the system and prevents nanocarbon agglomeration.

While the nanocarbon component should be sufficiently dispersed in a suitable fluid before it can be incorporated into an electrically-conducting resin, this fluid should not be a good solvent for the nanocarbon component. Instead, the fluid should act as an 'intermediate' solvent which permits the de-agglomeration of the bulk of the nanocarbon while causing occasional contact between the nanocarbon component particles for what is referred to as intermediate solubility of the nanocarbons. This occasional contact thus provides the requisite electrical conductivity. Good solvents, on the other hand, would tend to prevent such occasional contacts and therefore prevent electrical conductivity, while bad solvents would cause too many contacts between the nanocarbon component particles to enable objects fabricated from them to carry electrical current.

One method for the identification of suitable intermediate solvents that create intermediate solubility of the nanocarbons is to measure a physical quantity known as the osmotic second virial coefficient, or $B_{22}$. The value of $B_{22}$ is characteristic of a particular solute in a particular solvent, and provides a quantitative measure of how well the solute interacts with the solvent. For the present purpose, all of the other components in a resin mixture can be considered as solvents for the purpose of measuring the value of $B_{22}$. A positive value of $B_{22}$ means that the solute prefers to interact with solvent molecules rather than other solute molecules (or particles), whereas a negative value of $B_{22}$ means that the solute prefers to interact with other solute molecules (or particles) rather than solvent molecules. The absolute value of $B_{22}$ provides a measure of the strength of this preference. Thus, a nanocarbon-containing resin having intermediate solubility suitable for producing electrically-conducting objects would possess a value of $B_{22}$ from about $-10^{-1}$ to about $+10^{-1}$. In a preferred embodiment, the value of $B_{22}$ would range from about $-10^{-2}$ to about $+10^{-2}$, and in a more-preferred embodiment the value of $B_{22}$ would range from about $-10^{-3}$ to about $+10^{-3}$.

Certain types of materials have been found to provide the desired intermediate level of solubility of the nanocarbon components so as to lead to electrically-conducting compositions. These components imparting intermediate solubility of the nanocarbon include polyethers such as polyethylene glycol, polypropylene glycol, and their block copolymers and derivatives, such as the Triton® and Tween® family of detergents and related materials. The component imparting intermediate solubility of the nanocarbon may be present from about 1% to about 99% by weight, preferably from about 5% to about 95% by weight, an more preferably from about 20% to about 80% by weight.

These materials which can provide the necessary intermediate level of solubility of the nanocarbon components to enable electrical conductivity can be incorporated into energy-curable resins (such as resins that can be cured with light, heat, energy beam, or other form of energy) or other materials, such as thermoplastic melts, as underivatized components such as polyethylene glycol, polypropylene glycol, Tween®, Triton®, or combinations of such monomers and molecules.

These materials which can provide the necessary intermediate level of solubility of the nanocarbon components to enable electrical conductivity can also be incorporated into energy-curable resins or thermally-curable resins, or other materials, as derivatized components which can participate in further polymerization reactions. Such materials can include, for example, a wide range of photoreactive or thermally reactive groups for resins such as acrylates, methacrylates, cyanoacrylates, thiols, olefins, epoxides, halogenated materials, or any chemical moeity which can chemically react to form a covalent bond with another molecule.

Examples of such reactive intermediate solvent materials, from the enormous number of combinatorial possibilities which can be used, include polyethylene glycol 200 diacrylate (PEG 200 diacrylate), PEG 400 diacrylate, PEG 600 diacrylate, ethoxylated pentaerythritol tetraacrylate, bisphenol-A tetraethoxydiacrylate (BPA [$EO_4$] diacrylate), polypropylene glycol 800 diacrylate (PPG 800 diacrylate), polypropylene glycol 560 dimethacrylate (PPG 560 dimethacrylate), tri(propylene glycol)trimethacrylate, trimethylolpropanetriethoxytriacrylate, and 1,6-hexanediol ethoxylate diacrylate. Any of these acrylate products can also be substituted with methacrylate, cyanoacrylate, phenylacrylates, or any of the large number of such materials well known to those skilled in the art. These reactive intermediate solvent materials may be used in amounts from about 10% to about 95%, and preferably form about 15% to about 80%, and most preferably from about 20% to about 75%.

Initiators include a wide variety of materials which can cause monomers to polymerize, and can include photoinitiators which can be used to photopolymerize the nanocarbon-containing resin using electromagnetic energy to obtain electrically-conducting objects such as acetophenone, camphorquinone, 2,2-diethoxyacetophenone, ferrocene, 4-hydroxybenzophenone, anthraquinone, benzil, benzoin, 2-hydroxy-2-methylpropiophenone, bis(2,4,6-trimethylbenzoyl)-phenylphosphineoxide, benzophenone, 4-benzoylbiphenyl, phenylbis(2,4,6-trimethylbenzoyl)phosphine oxide, 4'-hydroxyacetophenone, phenanthrenequinone, thioxanthese-9-one, 4-benzoylbiphenyl, and many other such molecules well known to those skilled in the art.

Other types of initiators can also be used, such as those which can promote polymerization when exposed to heat, microwave energy, acoustic energy, and any other form of energy well known to those skilled in the art.

A convenient method to evaluate the degree of agglomeration of nanocarbons incorporated into composite materials may be a through examination of such materials by scanning electron microscopy (SEM) and/or transmission electron microscopy (TEM). The nanocarbon agglomerates are readily visible in SEM and/or TEM images at magnifications 1,000, 10,000, or 30,000 times and less, depending on agglomerate size. The non-agglomerated nanocarbons are much smaller in size and may be seen in SEM and/or TEM images at magnifications 40,000, or 50,000 times and higher, depending on the diameter of the nanocarbon.

The damage to nanocarbons caused by a harsh dispersion process may be evaluated by measuring Raman spectroscopy, in particular, using the intensity ratio of the so-called G-band and D-band. For example, the G-bands that are typically detected at about 1,580 cm$^{-1}$ (within ±20 cm$^{-1}$) are due to the non-defective graphitic CNT structure, while the D-bands (at about 1,350 cm$^{-1}$ within ±20 cm$^{-1}$) are predominantly due to structural defects, as disclosed by M. S. Dresselhaus, A. Jorio, A. G. Souza Filho and R. Saito, *Defect characterization in graphene and carbon nanotubes using Raman spectroscopy*, Phil. Trans. Royal Society A, vol. 368, pp. 5355-5377 (2010). The content of this publication is incorporated herein by reference.

The intensity ratio of the G-band to the D-band (i.e., the G/D ratio) may be used as a measure of relative concentration of CNT defects. Similar evaluation process based on G/D ratio may be used for graphene materials, as disclosed by A. C. Ferrari, *Raman spectroscopy of graphene and graphite: Disorder, electron-phonon coupling, doping and nonadiabatic effects*, Solid State Communications, vol. 143, pp. 47-57 (2007). The content of this publication is incorporated herein by reference.

To evaluate the damage inflicted on nanocarbon wall structures in the process of dispersing the CNT material, the G/D ratio may be measured and compared before and after the dispersion process. The comparison may be done using the same measurement conditions. The as-synthesized and/or the purified nanocarbon slurry may have the same or higher G/D ratio after the dispersion, while the agglomerated nanocarbons (e.g., dry powder) may have decreased G/D ratio after the dispersion due to the damage inflicted on the nanocarbon material during the dispersion process. The G/D ratio of a nanocarbon incorporated in a nanocarbon composite being 80% lower than, 50% lower than, 25% lower than, 10% lower than, 5% lower than, 4% lower than, 3% lower than, 2% lower than, 1% lower than, 0.5% lower than, 0.2% lower than, 0.1% lower than, or less than 0.1% lower than that of the as-synthesized nanocarbon may indicate a non-damaged nanocarbon. Also, the G/D ratio of a nanocarbon incorporated in a composite being at least 80% higher than, at least 50% higher than, at least 25% higher than, at least 10% higher than, at least 5% higher than, at least 4% higher than, at least 3% higher than, at least 2% higher than, at least 1% higher than, at least 0.5% higher than, at least 0.2% higher than, at least 0.1% higher than, or less than 0.1% higher than, or at least equal to that of the as-synthesized nanocarbon may indicate a non-damaged nanocarbon. Some exemplary features of products and processes of the instant disclosure may be summarized as follows.

A composite may comprise a nanocarbon ("the nanocarbon composite").

The nanocarbon may comprise a non-agglomerated, non-damaged nanocarbon, or a combination thereof.

The nanocarbon composite may further comprise a metal, a polymer, a ceramic, glass, or a combination thereof.

A 3-D printing system may comprise the nanocarbon composite.

A mechanical extruder may comprise the nanocarbon composite.

The non-agglomerated, the non-damaged nanocarbon, or the combination thereof may comprise a carbon nanotube, a graphene, a fullerene, or a combination thereof.

The carbon nanotube may comprise a single-wall carbon nanotube, a double-wall carbon nanotube, a multi-wall carbon nanotube, or a combination thereof.

The graphene may comprise a single layer graphene, a double layer graphene, a multilayer graphene, a graphene strips, or a combination thereof.

The fullerene may comprise a $C_{60}$, a $C_{70}$, a $C_{76}$, a $C_{78}$, a $C_{84}$, or a combination thereof.

The metals may comprise titanium, vanadium, chromium, manganese, iron, cobalt, nickel, copper, zinc, ruthenium, rhodium, palladium, aluminum, indium, gallium, tin, silver, gold, platinum, lead, bismuth, an alloy thereof, or a combination thereof. An alloy may comprise steel, bronze, brass, or a combination thereof.

The polymers may comprise ABS (acrylonitrile butadiene styrene), polyamide, nylon, polycarbonate, polyethylene, polypropylene, polyetherimide, polyphenylsulfone, polylactic acid, acrylics, epoxies, urethanes, polyesters, silicones, polyetherketones, polyetheretherketones, or their blends, mixtures, or a combination thereof.

The agglomeration of the nanocarbons may be visually detectable on an SEM image or a TEM image recorded at a magnification of 1,000; 5,000; 10,000; or 30,000. Absence of nanocarbons visible on an SEM image or a TEM image recorded at a magnification less than or equal to 1,000; 5,000; 10,000; or 30,000 may indicate a non-agglomerated nanocarbon.

An intensity ratio of the G-band (at 1,580±20 cm$^{-1}$) to the D-band (at 1,350±20 cm$^{-1}$) of the nanocarbons as determined by Raman spectroscopy the G/D ratio) may be used to evaluate the damage to nanocarbons due to a harsh processing.

The G/D ratio of a nanocarbon incorporated in a nanocarbon composite being 80% lower than, 50% lower than, 25% lower than, 10% lower than that of the as-synthesized nanocarbon may indicate a non-damaged nanocarbon. Also, the G/D ratio of a nanocarbon incorporated in a composite being at least 80% higher than, at least 50% higher than, at least 25% higher than, at least 10% higher than, or at least equal to that of the as-synthesized nanocarbon may indicate a non-damaged nanocarbon.

A composite may comprise a particle, a wire, a filament, or a combination thereof coated with a nanocarbon. The particle, the wire, the filament, or the combination thereof may comprise a metal, polymer, ceramic, or a combination thereof. This composite may be used as a feedstock for the selective laser sintering (SLS), powder, and/or fused deposition modeling (FDM) 3D printing technologies.

A composite may comprise a slurry containing a nanocarbon which can then be extruded as a viscous liquid and then cured to a solid by any common polymerization method, including photopolymerization, energy-beam curing, thermal curing, etc.

The particle, the wire, the filament, or the combination thereof may be coated with a nanocarbon by immersing the particle, the wire, the filament, or the combination thereof in the nanocarbon slurry. After the immersion, the composite may be taken out of the nanocarbon slurry and processed further.

The nanocarbon composite comprising non-agglomerated nanocarbon may be prepared by using an as-synthesized nanocarbon, a non-agglomerated nanocarbon, a non-damaged nanocarbon, a nanocarbon slurry, or a combination thereof.

A process may comprise using an as-synthesized nanocarbon, a non-agglomerated nanocarbon, a non-damaged nanocarbon, a nanocarbon slurry, or a combination thereof; and thereby preparing a nanocarbon composite comprising the non-agglomerated, the non-damaged nanocarbon, or the combination thereof.

The process may further comprise mixing the as-synthesized nanocarbon, the non-agglomerated nanocarbon, the non-damaged nanocarbon, the nanocarbon slurry, or the combination thereof with a polymer, a metal, a ceramic, or a combination thereof; and thereby preparing a nanocarbon composite comprising non-agglomerated and/or non-damaged nanocarbon.

The as-synthesized nanocarbon may comprise a non-agglomerated and/or non-damaged nanocarbon obtained from a nanocarbon reactor immediately after the growth of the nanocarbon ceases.

The as-synthesized nanocarbon may comprise an as-synthesized carbon nanotube, an as-synthesized graphene, an as-synthesized fullerene, or a combination thereof.

The as-synthesized carbon nanotube may comprise an as-synthesized single-wall carbon nanotube, an as-synthesized double-wall carbon nanotube, an as-synthesized multi-wall carbon nanotube, or a combination thereof.

The as-synthesized graphene may comprise an as-synthesized single layer graphene, an as-synthesized double layer graphene, an as-synthesized multilayer graphene, an as-synthesized graphene strips, or an as-synthesized combination thereof.

The as-synthesized fullerene may comprise an as-synthesized $C_{60}$, an as-synthesized $C_{70}$, an as-synthesized $C_{76}$, an as-synthesized $C_{78}$, a $C_{84}$, or a combination thereof.

The nanocarbon slurry is a slurry comprising a liquid and (a) the as-synthesized nanocarbon, (b) the non-agglomerated nanocarbon, (c) the non-damaged nanocarbon, or (d) the combination thereof.

The nanocarbon slurry is a slurry containing a substantial amount of a material which acts as an intermediate solvent for the nanocarbon.

The liquid may comprise water, a solvent, or a combination thereof.

The liquid may comprise a material consisting of a polymer backbone which provides an intermediate degree of solubility of the nanocarbon component with or without reactive groups attached to the backbone.

The solvent may comprise toluene, alcohol, carbon disulfide, dichlorobenzene, dimethylformamide, N-methylpyrrolidinone, pyridine, or a combination thereof.

The liquid may further comprise an acid.

The nanocarbon composite comprising a non-agglomerated and/or non-damaged nanocarbon may be produced by preparing a suspension comprising a non-agglomerated and/or non-damaged nanocarbon, and a monomer, an oligomer, and/or a photopolymer. This composite may be suitable for the stereolithographic 3-D printing technology.

Any combination of above products and processes may be within the scope of the instant disclosure.

The disclosure is illustrated further by the following additional examples that are not to be construed as limiting the disclosure in scope to the specific procedures or products described in them.

Example 1

As-synthesized multi-wall CNT material (comprising about 85 wt % inorganic impurities) may be refluxed in excess amount of about 1 M HCl for about 5 hours, and then filtered to remove the main volume of the acid while keeping the CNT material wet. The purified product (comprising about 2 weight % inorganic impurities) may be washed two times with de-ionized water to remove the residual acid, and then separated into two parts. One part may be dried in a convection oven at about 120° C. for about 4 hours and left aside for the next experiment described in Example 2. The second part may be kept wet and refluxed in neat water (at a CNT concentration of about 2 g/L) for about 5 hours to loosen up the CNTs. Finally, the CNT suspension may be passed 2 times through a high shear fluid processor such as a Microfluidizer processor from Microfluidics of Westwood, Mass., and the CNT concentration may be adjusted to about 1 g/L. A stable suspension of non-agglomerated and/or non-damaged CNTs may be obtained after these treatments. All these steps may be scalable, simple, efficient, fast, highly reproducible, and may yield stable suspensions containing non-agglomerated and/or non-damaged CNTs. The GM ratio as measured with about 532 nm laser excitation may vary in the range of 1.2 to 1.6, both before and after dispersion, indicating that the concentration of structural defects did not change appreciably.

Example 2

A dried powder of purified multi-wall CNT material (comprising about 3 weight % inorganic impurities) prepared as a stable CNT suspension as in Example 1 by first refluxing the dried power in water (at CNT concentration of about 2 g/L) for about 5 hours, then passing the suspension two times through a Microfluidizer high-shear fluid processor, and the CNT concentration may be adjusted to about 1 g/L. The G/D ratio for the multi-wall CNT dry powder material as measured with about 532 nm laser excitation may vary in the range of 1.1 to 1.4. After dispersing, the G/D ratio may decrease to a level varying in the range of 0.4 to 0.8 indicating an increased concentration of CNT defects.

The multi-wall CNT material may be provided, for example, by Thomas Swan & Co Ltd (UK), Nanocyl (Belgium), or many other suppliers of such materials. The Microfluidizer treatment step may be combined or substituted with any high-shear mixing, sonication, wet-ball milling, or another similar treatment, or a combination thereof. Similar simple and efficient processes may be designed to produce the as-synthesized or the purified non-agglomerated and/or non-damaged CNT slurries.

A highly dispersed and stable suspension of non-agglomerated and/or non-damaged CNT material ("the well-dispersed CNT suspension") is thereby obtained. The well-dispersed CNT suspension may be used in preparation of composites suitable for 3-D printing.

In the case of SLS and FDM technologies that use metal or plastic powder as feedstock, one technical challenge may be mixing nanocarbons with metal or plastic powders in a way that prevents nanocarbons from becoming airborne, and also affords achieving the desired proportions. Dry nanocarbon is comprised of particles that may be small (~1 mm or less in length, width, thickness, and/or specific dimension) and have relatively low density (varying in the range of 0.005 g/cc to 0.5 g/cc). These lightweight nanocarbon particles may easily get airborne thereby presenting potential health hazards and adversely affecting the nominal nanocarbon-to-metal or nanocarbon-to-plastic ratio.

This problem may be solved by devising a process to physically attach the lightweight nanocarbon particles to surfaces of metal or plastic particles which may be denser and easier to feed. This step may be carried out prior to feeding the particles into the 3-D printer, so that the feedstock may comprise a metal or plastic core coated with a nanocarbon shell.

On practical level, nanocarbon particles may be coated and attached to metal particles through a variety of coating techniques using a suspension of a nanocarbon in an either aqueous or organic solvent, such as spray coating, dip coating, spin coating, wet ball milling, or similar such processes. Process parameters may be determined by the type of nanocarbon which is employed, the type of metal, the shape and size of the particles, and/or the condition of the surfaces (such as terminating functional group). The strength of adhesion may need to be just sufficient to allow the metal particles to be processed up to the melting step without causing detachment of the coated nanocarbons.

After the melting step, the coated nanocarbons may be captured and incorporated within the metal matrix leading to improved properties, Incorporation of the non-agglomerated and/or non-damaged CNT into metal structures may result in a CNT composite with improved electrical, thermal, mechanical, and other properties that may be suitable for 3-D-printed products.

Exemplary procedures to produce CNT-coated metal or plastic particles are described in Examples 3 and 4, and CNT-coated metal or polymer wires or filaments are described in Example 5 below.

Example 3

Iron (Fe) powder granules (that have a diameter of about 0.05 mm) may be immersed into the aqueous suspension of non-agglomerated and/or non-damaged CNT prepared as in Example 1, agitated for about 2 hours with a magnetic stirrer, and then removed from the mixer and allowed to dry in a convection oven at about 120° C. for about 4 hours. The weight uptake by the granules after the mixing procedure may yield the amount of CNT attached to the granules. The CNT-coated iron granules may then be used as a feedstock for both SLS and FDM technologies.

Example 4

Iron granules (that have a diameter of about 0.05 mm) may be immersed into the aqueous suspension of non-agglomerated and/or non-damaged CNT prepared as in Example 1 and subjected to a modified wet-ball milling process. In particular, the wet iron/CNT mixture may be agitated for about 30 minutes in a ball milling apparatus with either standard balls or with the balls removed and the iron granules themselves acting as balls. Due to the repeated impacts with iron granules, CNTs get attached to the metal surface. The mixture may be removed from the ball milling apparatus and allowed to dry in a convection oven at about 150° C. for about 4 hours. Weighing the granules before and after the mixing procedure may yield the amount of CNTs attached to the granules. The CNT-coated iron granules may then be used as a feedstock for both SLS and FDM technologies.

Other type CNTs, graphenes and/or fullerenes may also be employed in this application either alone or in various combinations. Graphene may be present either as graphene oxide (which may have to be reduced back to graphene, e.g., through reaction with hydrazine) or pure graphene. The described process may also be used for other metals, such as titanium, vanadium, chromium, manganese, cobalt, nickel, copper, zinc, ruthenium, rhodium, palladium, aluminum, indium, gallium, tin, silver, gold, platinum, lead, bismuth, and alloys, such as steel, bronze, brass, and a combination thereof. These nanocarbons, metals, and/or alloys may be commercially available from many suppliers.

Plastics may also be utilized in a manner described in this example (customized for their particular properties, e.g., softening temperature). Examples of such plastics may comprise polymers such as ABS (acrylonitrile butadiene styrene), polyamide, nylon, polycarbonate, polyethylene, polypropylene, polyetherimide, polyphenylsulfone, polylactic acid, polyurethanes, and any combination thereof. Any of those plastics may commercially be available from many suppliers. Metal-plastic blends may also be used. The object produced from such a nanocarbon composite plastic may exhibit improved electrical, thermal, and mechanical properties.

Example 5

In the case of FDM technology which uses metal or polymer wires or filaments as a feedstock, a wire or filament may be coated with non-agglomerated and/or non-damaged CNT, A commercial polyamide plastic filament (typically, about 1-2 mm in diameter) may continuously and slowly be drawn through a bath containing the aqueous suspension of non-agglomerated and/or non-damaged CNT prepared in Example 1 allowing each segment of the filament to reside about 10-15 minutes in the bath. The suspension may continuously be agitated with a magnetic stirrer while the filament is being drawn.

After exiting the bath, the filament may be dried by passing through a convection oven heated to about 80° C. (safely below the plastic's softening temperature). In case of metal wires with relatively high melting or softening temperatures (such as above ~300° C.), the drying process may be carried out under inert atmosphere to prevent nanocarbon combustion. After drying, the CNT particles may adhere to the surface of plastic filaments and then get incorporated into the polymer structure in the process of 3-D printing, i.e., melting and extrusion.

Other type nanocarbon may also be employed in this application either alone or in various combinations. For example, graphene may be present either as graphene oxide (which may be reduced back to graphene, e.g., through the reaction with hydrazine) or pure graphene. Other plastics may also be utilized in a manner described in this example (customized for their particular properties, e.g., softening temperature). Examples of such plastics may include ABS (acrylonitrile butadiene styrene), polyamide, nylon, polycarbonate, polyethylene, polypropylene, polyetherimide, polyphenylsulfone, polylactic acid, polyurethanes, any combination thereof, and any blend thereof. Any of those plastics may commercially be available from many suppliers. The resulting 3-D printed product comprising nanocarbon composite plastic may exhibit improved electrical, thermal, and mechanical properties.

The described process may also be used for other metals, such as titanium, vanadium, chromium, manganese, cobalt, nickel, copper, zinc, ruthenium, rhodium, palladium, aluminum, indium, gallium, tin, silver, gold, platinum, lead, bismuth, and alloys, such as steel, bronze, brass, and any combination thereof. Metal-plastic blends may also be used.

Example 6

A typical procedure to produce CNT photopolymer resin for use in SLA technology is described in this example.

The suspension of non-agglomerated and/or non-damaged CNT prepared in Example 1 may be added to a liquid acrylic resin and agitated for about 5 hours at room temperature with a magnetic stirrer to ensure uniform distribution of CNT throughout the resin's volume. The mixture may then be loaded into an SLA 3-D printer. Under a UV laser irradiation, the acrylic photopolymer resin may solidify through a photopolymerization reaction to form the desired 3-D object defined by a computer system configured for this purpose. In the photopolymerization process, the suspended non-agglomerated and/or non-damaged CNTs may be captured within the newly-formed polymer structure imparting increased electrical conductivity, thermal conductivity, and improved mechanical properties.

Other types of CNTs, graphenes and/or fullerenes may also be employed in this application either alone or in various combinations. Graphene may be present either as graphene oxide or pure graphene. The graphene oxide may be expected to be reduced to pure graphene due to the UV radiation in the process of photopolymerization. Other photopolymer resins, such as epoxies, urethanes, polyesters, silicones, and their combinations and blends may also be used in this technique. All those plastics may commercially be available from many suppliers. Other mixing techniques such as high shear mixing, sonication, wet ball milling, dual-axis rotational mixing, or other similar treatments and their combinations may also be applied as needed.

Addition of nanocarbons to photopolymers may also impact the rate of photopolymerization reaction due to strong absorption of the UV and visible range radiation by nanocarbons and very high values for free charge carrier mobility. In nanocarbons, absorption of the UV and visible-range radiation may generate photoexcited electrons that may rapidly be re-distributed throughout the entire system. The overall impact may be beneficial resulting in a notable increase of the reaction rate due to high mobility and eventually leading to faster production times, which is essential for the commercialization of 3-D printing technologies.

In that regard, of special interest may be the fullerene photopolymer composites since fullerenes may have a rich photochemistry and, in particular, photopolymerization reactions of their own. Hence, presence of fullerenes in nanocarbon composite materials may lead to the highest improvement in the photopolymerization reaction rates.

Any combination of features of above process and product is within the scope of the instant disclosure.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

Unless otherwise stated, all measurements, values, ratings, positions, magnitudes, sizes, and other specifications that are set forth in this specification, including in the exemplary features that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a feature is intended to and should be interpreted to embrace the corresponding structures and materials that have been described and their equivalents. Similarly, the phrase "step for" when used in a feature is intended to and should be interpreted to embrace the corresponding acts that have been described and their equivalents. The absence of these phrases from a feature means that the feature is not intended to and should not be interpreted to be limited to these corresponding structures, materials, or acts, or to their equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or features are intended to indicate that the list is not exclusive and that other elements may be included. Similarly, an element preceded by an "a" or an "an" does not, without further constraints, preclude the existence of additional elements of the identical type.

The abstract is provided to help the reader quickly ascertain the nature of the technical disclosure. It is submitted with the understanding that it will not be used to interpret or limit the scope. In addition, various features in the foregoing detailed description are grouped together in various embodiments to streamline the disclosure.

Example 7

As one example, 42 mg of single-walled carbon nanotubes (SWCNT) obtained from OCSiAl (Palo Alto, Calif.) were added to a mixture of 40 mL of resin (MadeSolid Vorex) and 8 mL of neat toluene and the suspension was first bath sonicated for 30 minutes in a Branson (Danbury, Conn.) model 3210R-MTH ultrasonic cleaner and then a 1 mm thick×5 mm wide by 50 mm long strip was 3-D printed using a commercial stereolithographic printer (Form 1 from Form Labs, Boston, Mass.) to obtain a solid object in which the nanotubes appeared to be clearly agglomerated. The finished test strip was washed with isopropanol and then cured in sunlight for one hour. The conductivity of the test strip was then measured using a multimeter to obtain the electrical resistivity. This highly agglomerated test strip exhibited no conductivity (i.e. infinite resistance).

Example 8

As another example, the previous mixture from Example 7 was bath sonicated for an additional 2 hours in a Branson (Danbury, Conn.) model 3210R-MTH ultrasonic cleaner and then power sonicated for 2 minutes with a Branson (Danbury, Conn.) Digital Sonifier model 250 fitted with a model 102C probe. This sonicated resin mixture was then used to 3-D print a 1 mm thick×10 mm wide by 50 mm long strip using a commercial stereolithographic printer (Form 1 from Form Labs, Boston, Mass.) to obtain a solid object in which the CNTs appeared to be much less agglomerated. The finished test strip was washed with IPA and then cured in sunlight for one hour. The conductivity of the test strip was then measured using a multimeter to obtain the electrical resistance values. This highly agglomerated test strip exhibited a resistance which varied from segment to segment, ranging from about 1,000 ohms to infinite resistance.

Example 9

As another example, 23 mg of single-walled carbon nanotubes (SWCNT) obtained from OCSiAl (Palo Alto, Calif.) was added to 80 mL of Vorex resin (MadeSolid) and the suspension was power sonicated for 5 minutes with a Branson (Danbury, Conn.) Digital Sonifier model 250 fitted with a model 102C probe. This sonicated resin mixture was placed in the build vat of a commercial stereolithographic printer (Form 1 from Form Labs, Boston, Mass.) and used to produce a 1 mm thick×10 mm wide by 50 mm long strip in which the nanotubes appeared to be very uniformly distributed, with no CNT agglomeration visible. The highly-flexible finished test strip was washed with IPA and then cured in sunlight for one hour. The conductivity of the test strip was then measured using a multimeter to obtain the electrical resistivity. This highly agglomerated test strip exhibited an electrical resistance of ranging from about 1 megaohm to infinity.

Example 10

As another example, 60 mg of single-walled carbon nanotubes (SWCNT) obtained from OCSiAl (Palo Alto, Calif.) was added to 60 mL of Vorex resin (MadeSolid) to obtain a final SWCNT concentration of about 0.1% w/v and the suspension was power sonicated for 5 minutes with a Branson (Danbury, Conn.) Digital Sonifier model 250 fitted with a model 102C probe. This sonicated resin mixture was placed in the build vat of a commercial stereolithographic printer (Form 1 from FormLabs, Boston, Mass.) and used to produce a 1 mm thick×10 mm wide by 50 mm long strip in which the nanotubes appeared to be very uniformly distributed, with no CNT agglomeration visible. The highly-flexible finished test strip was washed with IPA and then cured in sunlight for one hour. The conductivity of the test strip was then measured using a multimeter to obtain the electrical resistance. This highly agglomerated test strip exhibited an electrical resistance of about one megaohm over the entire sample length.

Example 11

As another example, 48 mL of the SWCNT-containing suspension from 60 mg of single-walled carbon nanotubes (SWCNT) obtained from OCSiAl (Palo Alto, Calif.) was added to 60 mL of Vorex resin (MadeSolid) to obtain a final SWCNT concentration of about 0.1% w/v and the suspension was power sonicated for 5 minutes with a Branson (Danbury, Conn.) Digital Sonifier model 250 fitted with a model 1020 probe. This sonicated resin mixture was placed in the build vat of a commercial stereolithographic printer (Form 1 from Form Labs, Boston, Mass.) and used to produce a 1 mm thick×10 mm wide by 50 mm long strip in which the nanotubes appeared to be very uniformly distributed, with no CNT agglomeration visible. The highly-flexible finished test strip was washed with isopropanol and then cured in sunlight for one hour. The conductivity of the test strip was then measured using a four-probe multimeter (R-Chek, EDTM Inc.) to obtain the electrical resistance. This test strip exhibited an electrical resistance of about one megaohm over the entire sample length.

Example 12

As another example, 60 mg of single-walled carbon nanotubes (SWCNT) obtained from OCSiAl (Palo Alto, Calif.) was added directly to 50 mL of Vorex resin (MadeSolid) to obtain a final SWCNT concentration of about 0.12% Vorex and the suspension was power sonicated for 3 minutes with a Branson (Danbury, Conn.) Digital Sonifier model 250 fitted with a model 102C probe. This sonicated resin mixture was placed in the build vat of a commercial stereolithographic printer (Form 1 from FormLabs, Boston, Mass.) and used to produce a 1 mm thick×10 mm wide by 100 mm long strip in which the nanotubes appeared to be very uniformly distributed, with no CNT agglomeration visible. The highly-flexible finished test strip was washed with isopropanol and then cured in sunlight for one hour. The conductivity of the test strip was then measured using a using a four-probe multimeter (R-Chek, EDTM Inc.) to obtain the electrical resistance. This test strip exhibited an initial electrical resistance of about 400-600 k$\Omega$ over the entire 10-cm sample length, which fell to 200-300 k$\Omega$ over the entire 10-cm sample length after sitting overnight.

Example 13

As another example, three batches of about 30 mL each of photopolymer resin were prepared separately by mixing together about 20% of Photomer 4062 from IGM Resins (Bisphenol-A [4 EO] diacrylate, St. Charles, Ill.), about 55% to about 60% (and preferably about 59.24%) of Photomer 4050 (PEG 200 diacrylate, IGM Resins), about 20% of SR494 from Sartomer Americas (ethoxylated pentaerythritol tetraacrylate, Exton, Pa.), about 0.41% of single-walled carbon nanotubes (SWCNT) obtained from OCSiAl (Palo Alto, Calif.), and about 0.35% of Irgacure 819 (bis(2,4,6-trimethylbenzoyl)-phenylphosphineoxide, IGM Resins, Charlotte, N.C.) and then agitating each batch five times in a FlackTek (Landrum, S.C.) dual-axis rotational mixer at speeds which were increased from a starting about 1,000 r.p.m, up to about 1,700 r.p.m. for about 40 to about 60 seconds each. The combined mixture was placed in the build vat of a commercial stereolithographic printer (Form 1 from FormLabs, Boston, Mass.) and printed in a 50 µm layer height to produce a 1 mm thick×10 mm wide by 100 mm long strip. The highly-flexible finished test strip was washed with isopropanol and the resistivity of the test strip was measured using a four-probe multimeter (R-Chek, EDTM Inc.) to obtain an electrical resistivity of 40 $\Omega$-cm.

Example 14

As another example, a photopolymer resin was prepared by mixing together about 70% to about 75% (and preferably 72.92%) of Photomer 4050 (PEG 200 diacrylate, IGM Resins, St. Charles, Ill.), about 25% of SR494 from Sartomer Americas (ethoxylated pentaerythritol tetraacrylate, Exton, Pa.), about 2.0 weight % of BAPO (phenylbis(2,4, 6-trimethylbenzoyl)phosphine oxide), IGM Resins, Charlotte, N.C.), and about 40 mg of single-walled carbon nanotubes (SWCNT) obtained from OCSiAl (Palo Alto, Calif.), to obtain about 50 mL of resin. The resin was dispersed by power sonication with a Branson (Danbury, Conn.) Digital Sonifier model 250 fitted with a model 102C probe followed by agitation using a magnetic stirrer. The combined mixture was placed in the build vat of a commercial stereolithographic printer (Form 1 from FormLabs, Boston, Mass.) and printed to produce a 1 mm thick×10 mm wide by 100 mm long strip. The flexible finished test strip was washed with isopropanol and the resistivity of the test strip was measured using a four-probe multimeter (R-Chek, EDTM Inc.) to obtain an the electrical resistivity ranging from 1.0 to 10 Ω-cm.

With respect to Examples 13 and 14, in particular, it was determined that resin compositions containing SWCNT were not conductive when fully solubilized, Instead, conductivity was found to require a modest, 'intermediate' level of solubility, such that some contact between individual nanotube strands was maintained in order to yield significant electrical conductivity. This outcome was produced when using components containing PEG oligomers bearing various photopolymerizable functional groups or other functional. Other potential materials that would function similarly include polyethers such as polypropylene glycol, block co-polymers of ethylene glycol and propylene glycol such as the Pluronic® and/or Tween® lines of surfactants, as well as other similar, mild detergents. Additional acrylates that can be used as polymerizable agents include, but are not limited, to methacrylates, diacrylates, triacrylates, tetraacrylates, pentaacrylates, hexaacrylates, and cyanoacrylates.

Further, it was also determined that a significant amount of agitation was required to disperse the nanotubes, but excessive agitation was found to damage the nanotubes by breaking them and potentially oxidizing them. The mixtures and processes in Examples 13 and 14, however, were found to produce liquid resin mixtures and printed objects that possessed significant electrical conductivity.

Therefore, a resin, such as an energy-curable resin, which can be used to created electrically-conductive objects, for example, via 3-D printing, may be created by combining a photoinitiator; a polymerizable agent; and single-walled carbon nanotubes. The resin may further comprise a component imparting intermediate solubility. The single-walled carbon nanotubes can make up about 0.01% to about 4% of the total weight of the resin. Preferably, the carbon nanotubes make up about 0.08% to about 0.41% of the total weight of the conductive resin.

The photopolymerizable agent may comprise one or more acrylates, such as bisphenol-A [4 EO] diacrylate, PEG 200 diacrylate, and ethoxylated pentaerythritol tetraacrylate.

Preferably, the conductive resin may comprise about 55% to about 75% by weight of PEG 200 diacrylate. In some embodiments, the conductive resin may comprise about 10% to about 95% by weight of PEG 200 diacrylate, and preferably about 20% to 85% by weight of PEG 200 diacrylate.

Preferably, the conductive resin comprises about 20% to about 25% by weight of ethoxylated pentaerythritol tetraacrylate. In some embodiments, the conductive resin comprises about 10% to about 95% by weight of ethoxylated pentaerythritol tetraacrylate, or preferably about 15% to about 70% by weight of ethoxylated pentaerythritol tetraacrylate.

Preferably, the conductive resin comprises about 15% to about 35% by weight of bisphenol-A [4 EO] diacrylate. In some embodiments, the resin may further comprise about 5% to about 80% by weight of bisphenol-A [4 EO] diacrylate, or preferably about 10% to about 60% by weight of bisphenol-A [4 EO] diacrylate.

The initiator may be bis(2,4,6-trimethylbenzoyl)-phenylphosphineoxide or phenylbis(2,4,6-trimethylbenzoyl) phosphine oxide. Preferably, the resin may comprise about 0.30% to about 0.40% by weight of bis(2,4,6-trimethylbenzoyl)-phenylphosphineoxide or phenylbis(2,4,6-trimethylbenzoyl)phosphine oxide. In some embodiments, the resin may comprise about 0.01% to about 4% by weight of bis(2,4,6-trimethylbenzoyl)-phenylphosphineoxide or phenylbis(2,4,6-trimethylbenzoyl)phosphine oxide, or preferably about 0.20% to about 0.50% by weight of phenylbis (2,4,6-trimethylbenzoyl)phosphine oxide or phenylbis(2,4, 6-trimethylbenzoyl)phosphine oxide.

The mixture can be agitated in a mixer at speeds from about 300 r.p.m, to about 3,500 r.p.m, or preferably from about 500 r.p.m. to about 3,000 r.p.m., or most preferably from about 1,000 r.p.m. to about 1,700 r.p.m. In some embodiments, the speed of the mixer may progressively increase during the agitation within the speeds disclosed above. The agitation step can last from about 10 seconds to about 120 seconds each time, or preferably from about 20 seconds to about 120 seconds each time, or most preferably from about 40 seconds to about 60 seconds each time. In some embodiments, the mixture is agitated up to one, two, three, four, five times, or more.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto,

What is claimed is:

1. An energy-curable resin configured for creating electrically-conductive objects, comprising:
    a. an initiator;
    b. a polymerizable agent; and
    c. nanocarbon, the nanocarbon comprising any one of a carbon nanotube, a graphene, a fullerene, nanodiamonds, or any combination thereof, wherein the nanocarbon makes up about 0.01% to about 4% of a total weight of the resin, wherein the nanocarbon exhibits an osmotic second virial coefficient value ($B_{22}$) from about $-10^{-1}$ to about $10^{-1}$.

2. The energy-curable resin of claim 1, wherein the polymerizable agent comprises any one of polysilanes, polysiloxanes, or any combination thereof.

3. The energy-curable resin of claim 1, wherein the polymerizable agent comprises any one of acrylonitrile butadiene styrene, polyamides, nylons, polyimides, polyetherimides, polyurethanes, or any combination thereof.

4. The energy-curable resin of claim 1, wherein the polymerizable agent comprises any one of polyepoxides, polythioethers, or any combination thereof.

5. The energy-curable resin of claim 1, wherein the polymerizable agent comprises any one of polycarbonates, polyethylenes, polypropylenes, polylactic acids, polyesters, or any combination thereof.

6. The energy-curable resin of claim 1, wherein the polymerizable agent comprises any one of polysulfones, polyethersulfones, polyphenylsulfones, or any combination thereof.

7. The energy-curable resin of claim 1, wherein the polymerizable agent comprises any one of acrylates, methacrylates, cyanoacrylates, or any combination thereof.

8. The energy-curable resin of claim 1, wherein the polymerizable agent comprises any one of thiols, olefins, epoxides, halogenated materials, or any combination thereof.

9. The energy-curable resin of claim 1, wherein the polymerizable agent comprises a polysilane.

10. The energy-curable resin of claim 1, wherein the polymerizable agent comprises a polysiloxane.

11. The energy-curable resin of claim 1, wherein the polymerizable agent comprises an acrylonitrile butadiene styrene.

12. The energy-curable resin of claim 1, wherein the polymerizable agent comprises a polyamide.

13. The energy-curable resin of claim 1, wherein the polymerizable agent comprises a nylon.

14. The energy-curable resin of claim 1, wherein the polymerizable agent comprises a polyimide.

15. The energy-curable resin of claim 1, wherein the polymerizable agent comprises a polyetherimide.

16. The energy-curable resin of claim 1, wherein the polymerizable agent comprises a polyurethane.

17. The energy-curable resin of claim 1, wherein the polymerizable agent comprises a polyepoxide.

18. The energy-curable resin of claim 1, wherein the polymerizable agent comprises a polythioether.

19. The energy-curable resin of claim 1, wherein the polymerizable agent comprises a polycarbonate.

20. The energy-curable resin of claim 1, wherein the polymerizable agent comprises a polyethylene.

21. The energy-curable resin of claim 1, wherein the polymerizable agent comprises a polypropylene.

22. The energy-curable resin of claim 1, wherein the polymerizable agent comprises a polylactic acid.

23. The energy-curable resin of claim 1, wherein the polymerizable agent comprises a polyester.

24. The energy-curable resin of claim 1, wherein the polymerizable agent comprises a polysulfone.

25. The energy-curable resin of claim 1, wherein the polymerizable agent comprises a polyethersulfone.

26. The energy-curable resin of claim 1, wherein the polymerizable agent comprises a polyphenylsulfone.

27. The energy-curable resin of claim 1, wherein the polymerizable agent comprises an acrylate.

28. The energy-curable resin of claim 1, wherein the polymerizable agent comprises a methacrylate.

29. The energy-curable resin of claim 1, wherein the polymerizable agent comprises a cyanoacrylate.

30. The energy-curable resin of claim 1, wherein the polymerizable agent comprises a thiol.

31. The energy-curable resin of claim 1, wherein the polymerizable agent comprises an olefin.

32. The energy-curable resin of claim 1, wherein the polymerizable agent comprises an epoxide.

33. The energy-curable resin of claim 1, wherein the polymerizable agent comprises a halogenated material.

34. An object produced from the resin of claim 1.

* * * * *